US009436306B2

(12) United States Patent
Oguri

(10) Patent No.: US 9,436,306 B2
(45) Date of Patent: Sep. 6, 2016

(54) PORTABLE TERMINAL DEVICE AND PROGRAM

(75) Inventor: Shinji Oguri, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/346,321

(22) PCT Filed: Sep. 10, 2012

(86) PCT No.: PCT/JP2012/005702
§ 371 (c)(1),
(2), (4) Date: Mar. 20, 2014

(87) PCT Pub. No.: WO2013/042331
PCT Pub. Date: Mar. 28, 2013

(65) Prior Publication Data
US 2014/0221051 A1 Aug. 7, 2014

(30) Foreign Application Priority Data
Sep. 21, 2011 (JP) .................. 2011-205747

(51) Int. Cl.
*H04B 1/38* (2015.01)
*G06F 3/041* (2006.01)
(Continued)

(52) U.S. Cl.
CPC ............. *G06F 3/041* (2013.01); *G06F 1/3206* (2013.01); *G06F 1/3231* (2013.01);
(Continued)

(58) Field of Classification Search
CPC ........... H04M 1/72519; H04W 84/18; H04W 52/0254; G06F 1/1626; G06F 3/0488; G06F 3/0346; G06F 3/016; G06F 3/038; G06F 3/0317; G06F 3/03543; G06F 3/0421; G06F 3/041
USPC ....... 455/566, 41.2; 345/169, 173, 158, 156, 345/157, 166, 163, 175; 178/18.01
See application file for complete search history.

(56) References Cited

U.S. PATENT DOCUMENTS 6,590,568 B1 * 7/2003 Astala et al. ................. 345/173
7,714,265 B2 5/2010 Fadell et al.
(Continued)

FOREIGN PATENT DOCUMENTS

JP  2001-069235     3/2001
JP  2002-323885 A  11/2002
(Continued)

OTHER PUBLICATIONS

Hiroyuki-machine translation—JP2001—069235A.pdf.*
(Continued)

*Primary Examiner* — Olumide T Ajibade Akonai
*Assistant Examiner* — Alexander Yi
(74) *Attorney, Agent, or Firm* — Wilmer Cutler Pickering Hale and Dorr LLP

(57) ABSTRACT

The present invention is to enable a portable telephone capable of switching to a power conservation state so as to reduce power consumption by limiting the supply of power, in which the limit on the supply of power can be partially removed immediately before the portable telephone is used, without the necessity of cancelling the power conservation mode through a mechanical button operation to restore the normal power state. In the case while the supply of power to a predetermined peripheral device (touch panel) is being limited by a power conservation mode, an acceleration sensor detects vibrations applied to the portable telephone as a first state and a brightness sensor detects the ambient brightness of the portable telephone as a second state, a CPU removes the limit on the supply of power to the predetermined peripheral device on the basis of the first state and the second state.

7 Claims, 8 Drawing Sheets

(51) Int. Cl.
*H04W 52/02* (2009.01)
*G06F 1/32* (2006.01)

(52) U.S. Cl.
CPC ........ *G06F 1/3287* (2013.01); *H04W 52/027* (2013.01); *H04W 52/0254* (2013.01); *G06F 2203/04106* (2013.01); *H04M 2250/12* (2013.01); *H04M 2250/22* (2013.01); *Y02B 60/1282* (2013.01); *Y02B 60/1289* (2013.01); *Y02B 60/50* (2013.01)

(56) References Cited

U.S. PATENT DOCUMENTS

| | | |
|---|---|---|
| 8,031,164 B2 | 10/2011 | Herz et al. |
| 8,121,656 B2 | 2/2012 | Imai |
| 8,321,710 B2 | 11/2012 | Yamamoto et al. |
| 8,536,507 B2 | 9/2013 | Fadell et al. |
| 8,829,414 B2 | 9/2014 | Fadell et al. |
| 2007/0171088 A1* | 7/2007 | Sato ........................... 340/686.6 |
| 2008/0006762 A1 | 1/2008 | Fadell et al. |
| 2008/0165115 A1 | 7/2008 | Herz et al. |
| 2009/0060293 A1* | 3/2009 | Nagao et al. ................ 382/118 |
| 2010/0079508 A1 | 4/2010 | Hodge et al. |
| 2010/0120477 A1 | 5/2010 | Imai |
| 2010/0207879 A1 | 8/2010 | Fadell et al. |
| 2010/0218024 A1 | 8/2010 | Yamamoto et al. |
| 2012/0001960 A1 | 1/2012 | Herz et al. |
| 2013/0135198 A1 | 5/2013 | Hodge et al. |
| 2013/0341494 A1 | 12/2013 | Fadell et al. |
| 2014/0132508 A1 | 5/2014 | Hodge et al. |

FOREIGN PATENT DOCUMENTS

| | | |
|---|---|---|
| JP | 2007-311849 | 11/2007 |
| JP | 2008-060815 | 3/2008 |
| JP | 2010-118834 | 5/2010 |

OTHER PUBLICATIONS

International Search Report corresponding to PCT/JP2012/005702, dated Nov. 27, 2012; 1 page.
Supplementary European Search Report issued by the European Patent Office for Application No. 12833100.6 dated Apr. 7, 2015 (6 pages).
Japanese Office Action issued by the Japan Patent Office for Application No. JP 2011-205747 dated May 25, 2015 (6 pages).
Extended European Search Report issued by the European Patent Office for Application No. 12833100.6 dated Aug. 11, 2015 (10 pages).

* cited by examiner

FIG. 3

| BLOCK (COMPONENT) | NORMAL POWER MODE | POWER CONSERVATION MODE |
|---|---|---|
| CPU | ON | ON (LOWEST MINIMUM OPERATION) |
| MEMORY UNIT | ON | ON |
| TIMER UNIT | ON | ON |
| POWER-SUPPLY BUTTON | ON | ON |
| ACCELERATION SENSOR | ON | ON |
| BRIGHTNESS SENSOR | ON | ON |
| LCD | ON | OFF |
| TOUCH PANEL | ON | OFF |
| LCD POWER SUPPLY | ON | OFF |
| LCD CONTROLLER | ON | OFF |
| TOUCH PANEL POWER SUPPLY | ON | OFF |
| TOUCH PANEL CONTROLLER | ON | OFF |
| ...... | ...... | ...... |

PORTABLE TERMINAL DEVICE AND PROGRAM

CROSS-REFERENCE TO RELATED APPLICATIONS

This application is a national stage application of International Application No. PCT/JP2012/005702 entiled "Portable Terminal Device and Program," filed on Sep. 10, 2012, which claims the benefit of the priority of Japanese Patent Application No. 2011-205747, filed on Sep. 21, 2011, the disclosures of each of which are hereby incorporated by reference in their entirety.

TECHNICAL FIELD

The present invention relates to a portable terminal device capable of reducing power consumption by limiting the supply of power and a program of such a device.

BACKGROUND ART

In recent years, in the case of a portable terminal device such as a multifunctional portable telephone referred to as a smart phone, since a touch panel is mounted thereon as an operation input device, the number of mechanical push buttons is extremely limited, and many of them are provided with only the power-supply button for use in turning ON/OFF the power supply. Moreover, as a method for reducing power consumption, such a multifunctional portable terminal device uses a power conservation method in which switching is made between a normal power state (normal power mode) in which the power supply is not limited and a power conservation state (power conservation mode) in which the power consumption is reduced by limiting the power supply. In this case, the switching from the normal power mode to the power conservation mode is carried out on the basis of a non-operation period of time from the operation of the last time to the next operation, and when switched to the power conservation mode, the power supply to a liquid crystal device is cut-off, or the backlight of the display device is turned off so that the power consumption is reduced to the minimum level.

Moreover, conventionally, a technique has been known (see Patent Document 1) in which when switching is made to the above-mentioned power conservation mode, the power supply to a display unit is cut-off and the processing frequency of massage receipt or the like is lowered so that the power consumption is further reduced. Moreover, another technique has been known in which in addition to the display unit, the power supply to the touch screen unit is also cut-off for reducing the power consumption (see Patent Document 2).

PRIOR ART DOCUMENTS

Patent Documents

Patent Document 1: JP 2010-118834
Patent Document 2: JP 2007-311849

SUMMARY OF INVENTION

Problem to be Solved by the Invention

In the above-mentioned power consumption mode, such steps may be taken in which the power supply to the liquid crystal display device is cut-off to turn its power supply "OFF", the backlight of the display device is turned off and the power supply to the touch panel is cut-off to turn its power supply "OFF"; however, when the power supply to the touch panel is turned "OFF", since the device becomes completely no-responsible even when a human body is made in contact with the touch panel, only the way to restore a normal power mode is pressing down the mechanical power-supply button to cancel the power conservation mode.

However, in the portable terminal device such as a smart phone, the user attaches a cover over the entire terminal device in many cases, with the result that depending on the set position of the power-supply button, the pressing down operation of the power-supply button becomes very difficult. For this reason, each time the power conservation mode is cancelled, a time-consuming pressing down operation of the power-supply button is required with the result that the user friendliness tends to be impaired.

The present invention relates to a portable terminal device capable of switching to a power consumption state for reducing the power consumption by limiting the supply of power, and its object is to provide a system in which without the necessity of restoring a normal power mode by cancelling the power conservation mode through a mechanical button operation, the limit on the power supply can be partially removed immediately before using the portable terminal device.

Means for Solving the Problem

In order to achieve the above-mentioned object, one non-limiting mode of the present invention is provided with:
a portable terminal device including a power switching section for carrying out switching between a normal power state in which power supply is not limited and a power conservation state in which the power supply is limited to reduce power consumption, the portable terminal device further comprising:
a first state detection section for detecting vibrations applied to the portable terminal device as a first state;
a second state detection section for detecting a surface state of the portable terminal device or a peripheral state thereof as a second state; and
a power control section which, in the case when a power supply to a predetermined peripheral device is limited, with switching being made by the power switching section to the power conservation state, removes the limit on the supply of power to the predetermined peripheral device based upon the first state detected by the first state detection section and the second state detected by the second state detection section.

In order to achieve the above-mentioned object, another non-limiting mode of the present invention is provided with:
a non-transitory computer-readable storage medium having a program stored thereon that is executable by a computer to perform functions comprising:
carrying out switching between a normal power state in which power supply is not limited and a power conservation state in which the power supply is limited to reduce power consumption;
detecting vibrations applied to a portable terminal device as a first state;
detecting a surface state of the portable terminal device or a peripheral state thereof as a second state; and
in the case when a power supply to a predetermined peripheral device is limited, with switching being set to the power conservation state, removing the limit on the supply of power to the predetermined peripheral device based upon the first detected state and the second detected state.

Effect of the Invention

According to the present invention, in a portable terminal device capable of switching to a power consumption state for reducing the power consumption by limiting the supply of power, without the necessity of restoring a normal power mode by cancelling the power conservation mode through a mechanical button operation, the limit on the power supply can be partially removed immediately before using the portable terminal device, thereby making it possible to achieve good applicability and practical usability.

BRIEF DESCRIPTION OF DRAWINGS

FIG. 3 is a view for use in explaining a power supply state of each of components (blocks) forming the portable telephone in accordance with each of a normal power mode and a power conservation mode.

DESCRIPTION OF EMBODIMENTS

An embodiment of the present invention is described below in detail with reference to the drawings.
(First Embodiment)

First, referring to FIG. 1 to FIG. 5, the following description will discuss the first embodiment of the present invention.

Figure 1:
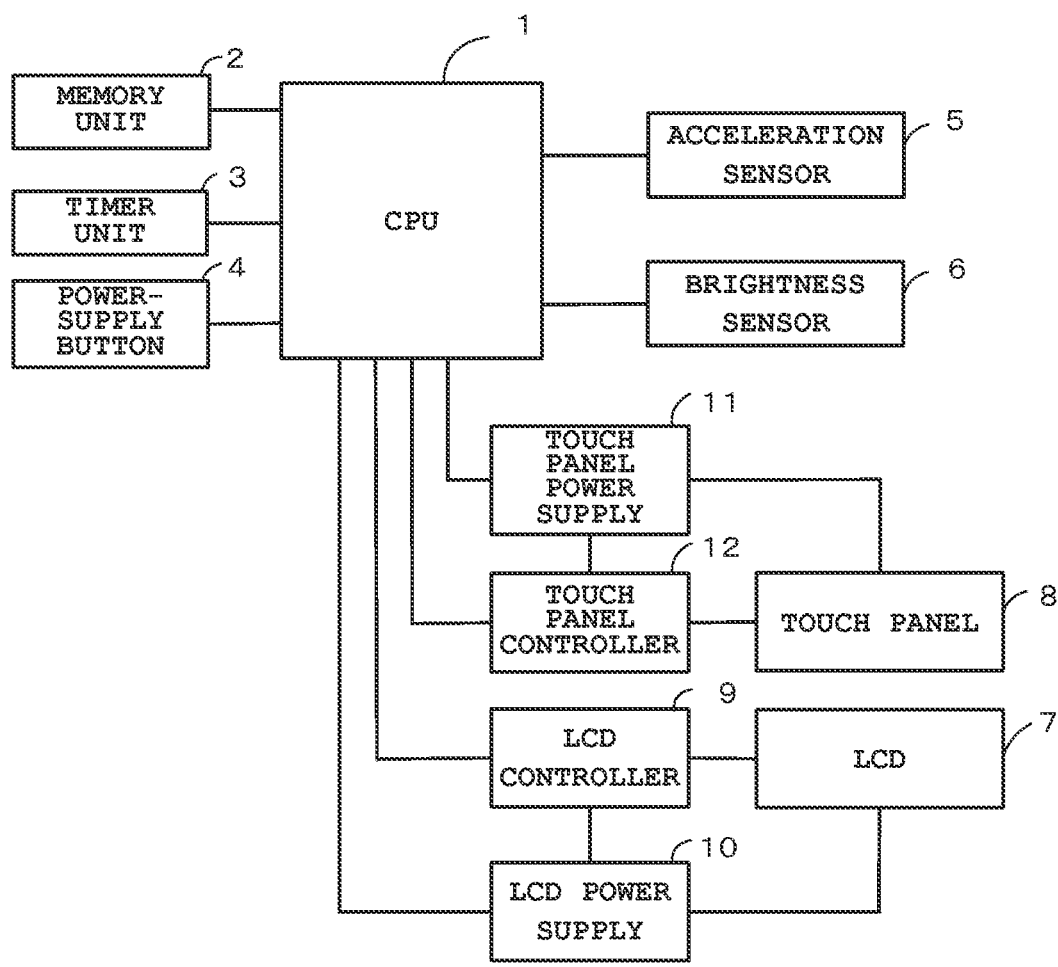
FIG. 1 is a block diagram that shows a basic configuration of a portable telephone of a multifunctional type referred to as a smart phone that is applied as a portable terminal device.

FIG. 1 is a block diagram that shows a basic configuration of a portable telephone of a multifunctional type referred to as a smart phone that is applied as a portable terminal device. This portable telephone (smart phone) is equipped with functions of various kinds, such as a voice call function, an e-mail function and the Internet access function (Web access function), and is provided with a radio communication unit, a call-use speaker, a call-use microphone, and the like, although illustrations thereof are omitted from FIG. 1. Moreover, when connected to another portable telephone through a radio communication network (not shown), the portable telephone is brought into a communicable state with another portable telephone, or transmittable and receivable states of electronic mails therewith. Furthermore, when connected to the Internet (not shown) through a radio communication network, the portable telephone is allowed to access to a Web site so as to view the site, or allowed to download multimedia contents, such as videos or music.

A CPU 1 refers to a central processing unit that is operated by supplied power from a battery unit (not shown) provided with a secondary battery, and controls the entire operations of the portable telephone in accordance with various kinds of programs inside a memory unit 2. The memory unit 2 in which, in addition to programs, various kinds of applications and the like for use in realizing the present embodiment in accordance with operation sequences shown in FIG. 4 and FIG. 5, data required for these, timer set values for use in non-operation period of time to be described later, data preserved by the user, various set values, and the like are stored, and this is further used as a work memory that temporarily stores data. Moreover, the memory unit 2 may have a structure including a detachable/attachable portable memory (recording media), such as an SD card or an IC card.

A timer unit 3 is a timer for measuring a non-operation period of time from the operation carried out last time to the next operation, and upon detection that the non-operation period of time measured by the timer unit 3 has exceeded a predetermined timer set value, the CPU 1 switches power modes so that a normal power state (normal power mode) in which power supply is not limited is switched to a power conservation state (power conservation mode) in which the power supply is limited to reduce power consumption. A power-supply button 4 is a mechanical push button for use in ON/OFF operating the power supply of the portable telephone, and the CPU 1 carries out a power OFF processing when the power-supply button 4 is pressed under the normal power mode; however, when the power-supply button 4 is pressed under the switched state to the power conservation mode, the CPU 1 cancels the power conservation mode to restore the normal power mode.

In the switched state to the power conservation mode, an acceleration sensor 5 detects a state of vibrations (shaking) applied to the portable telephone as a first state of the portable telephone, and outputs a voltage value having an vibration waveform corresponding to the size of the vibrations (acceleration), and is prepared as an acceleration sensor with three axes having a structure in which, for example, voltage values, which are in proportion to the sizes of acceleration components in three axes directions (X-Y-Z directions) mutually orthogonal to one another, that is, the sizes of accelerations applied to three axes of a front to rear direction, a lateral direction and a longitudinal direction, are outputted; however, of course, this is not intended to be limited by the three-axes acceleration sensor. Based upon whether or not the size of vibrations (acceleration) of the three axes detected by the acceleration sensor 5 has reached a predetermined reference value (reference acceleration value) or more in the switched state to the power conservation mode, the CPU 1 judges whether or not the portable telephone is brought into a state to be possibly used, for example, into a state in which the portable telephone is held by the hand or a state in which the portable telephone in the held state by the hand is shifted. Additionally, the reference acceleration values corresponding to the acceleration components in three axes of a front to rear direction, a lateral direction and a longitudinal direction may be set; however, of course, a reference acceleration value commonly used for the acceleration components of the three axes may be set.

A brightness sensor 6 is a brightness meter that detects brightness on the periphery of the portable telephone in the switched state to the power conservation mode as a second state of the portable telephone, and based upon whether or not a peripheral amount of light detected by the brightness sensor 6 is a reference value (reference brightness value) or more, the CPU 1 is adapted to judge whether or not there is a possibility of the portable telephone being put into a bag, a clothing pocket, or the like. In the case of a bright environment where the peripheral amount of light is the reference brightness value or more, the CPU 1 judges that the portable telephone is in the environment not being put into a bag or a clothing pocket, or the like, and that the portable telephone is possibly used, while in the case of a dark environment where the peripheral amount of light is less than the reference brightness value, the CPU 1 judges that the portable telephone might possibly be in a bag or a clothing pocket, or the like, and that there is no possibility of the portable telephone being used.

On the other hand, to the CPU 1, an LCD (liquid crystal display device) 7, a touch panel 8 and the like serving as peripheral devices are connected. These LCD 7 and touch panel 8 constitute a touch screen (touch input display unit), and the transparent touch panel 8 is laminated and disposed on the entire upper surface of the LCD 7. On the LCD 7 side, an LCD power supply 9 and an LCD controller 10 are installed, and on the touch panel 8 side, a touch panel power supply 11 and a touch panel controller 12 are installed. Here, the LCD 7 is controlled by the LCD controller 10, and under control by the CPU 1, the LCD power supply 9 supplies power to the LCD controller 10 and the LCD 7. The touch panel 8 is controlled by the tough panel controller 12, and under control by the CPU 1, the touch panel power supply 11 supplies power to the touch panel controller 12 and the touch panel 8.

Figure 2:
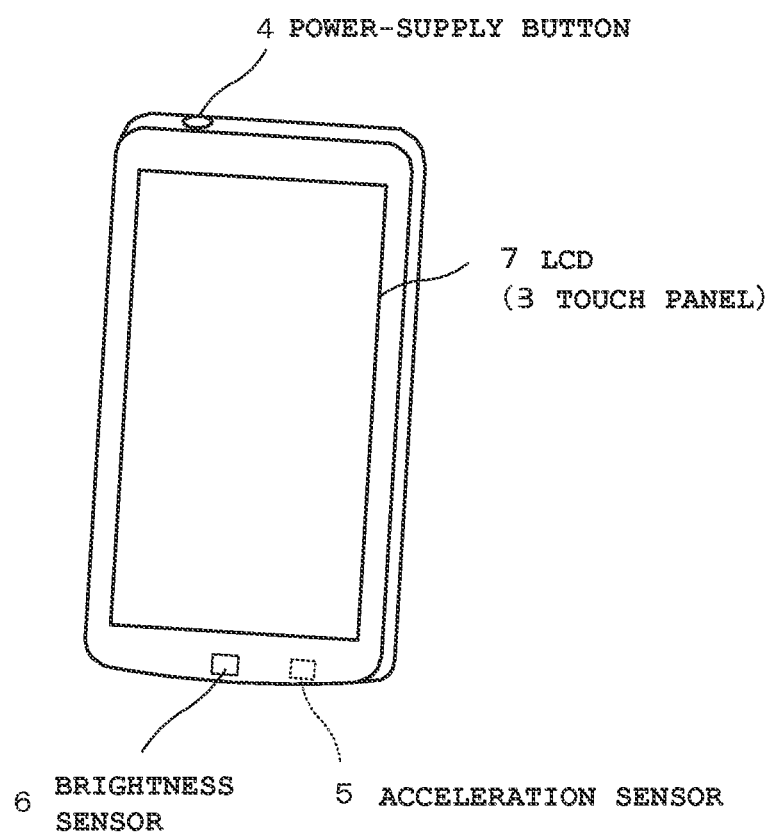
FIG. 2 is an outside perspective view of the portable telephone.

FIG. 2 is an outside perspective view of the portable telephone.

The entire casing of the portable telephone has a thin rectangular body, and virtually on the entire region on the front face portion, the LCD 7 and touch panel 8 forming a touch screen (touch input display unit) are disposed. Moreover, on the front face portion of the casing, the acceleration sensor 5 and the brightness sensor 6 are installed below (front face lower end portion of the casing) the LCD 7 and the touch panel 8. Moreover, a power supply button 4 is disposed on an upper end portion of the casing serving as a position that the user cannot easily operate so as to prevent erroneous operations. Additionally, it is needless to say that the layout positions of the acceleration sensor 5, the brightness sensor 6, and the power supply button 4 are not limited by the above-mentioned positions.

FIG. 3 is a view for use in explaining a power supply state of each of components (blocks) forming the portable telephone in accordance with each of the normal power mode and the power conservation mode.

In the normal power mode, a power supply "ON" state is prepared in which power is supplied to all the components (blocks), that is, the CPU 1, the memory unit 2, the timer unit 3, the power supply button 4, the acceleration sensor 5, the brightness sensor 6, the LCD 7, the touch panel 8, the LCD power supply 9, the LCD controller 10, the touch panel power supply 11, the touch panel controller 12, and the like. In the power conservation mode, although the power supply "ON" state for supplying power is prepared for the CPU 1, the memory unit 2, the timer unit 3, the power supply button 4, the acceleration sensor 5, and the brightness sensor 6, a power supply "OFF" state in which power supply is limited (cut-off) is imposed on the LCD 7, the touch panel 8, the LCD power supply 9, the LCD controller 10, the touch panel power supply 11, the touch panel controller 12, and the like. Additionally, in the power conservation mode, the CPU 1 is in a power "ON" state that allows a lowest minimum operation.

Figure 4:
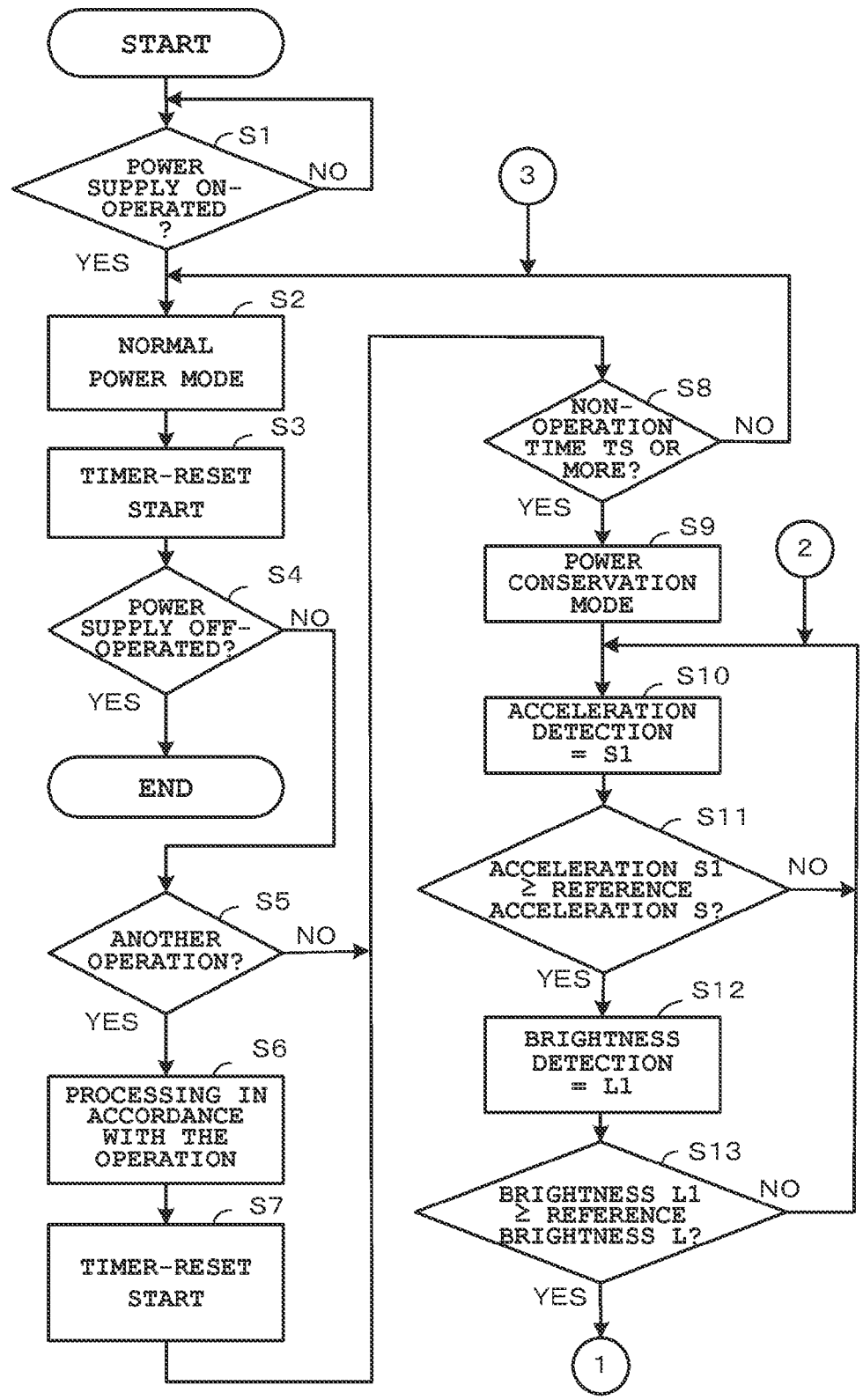
FIG. 4 is a flowchart showing an outline of the entire operations of the portable telephone, with features of a first embodiment being focused.
Figure 5:
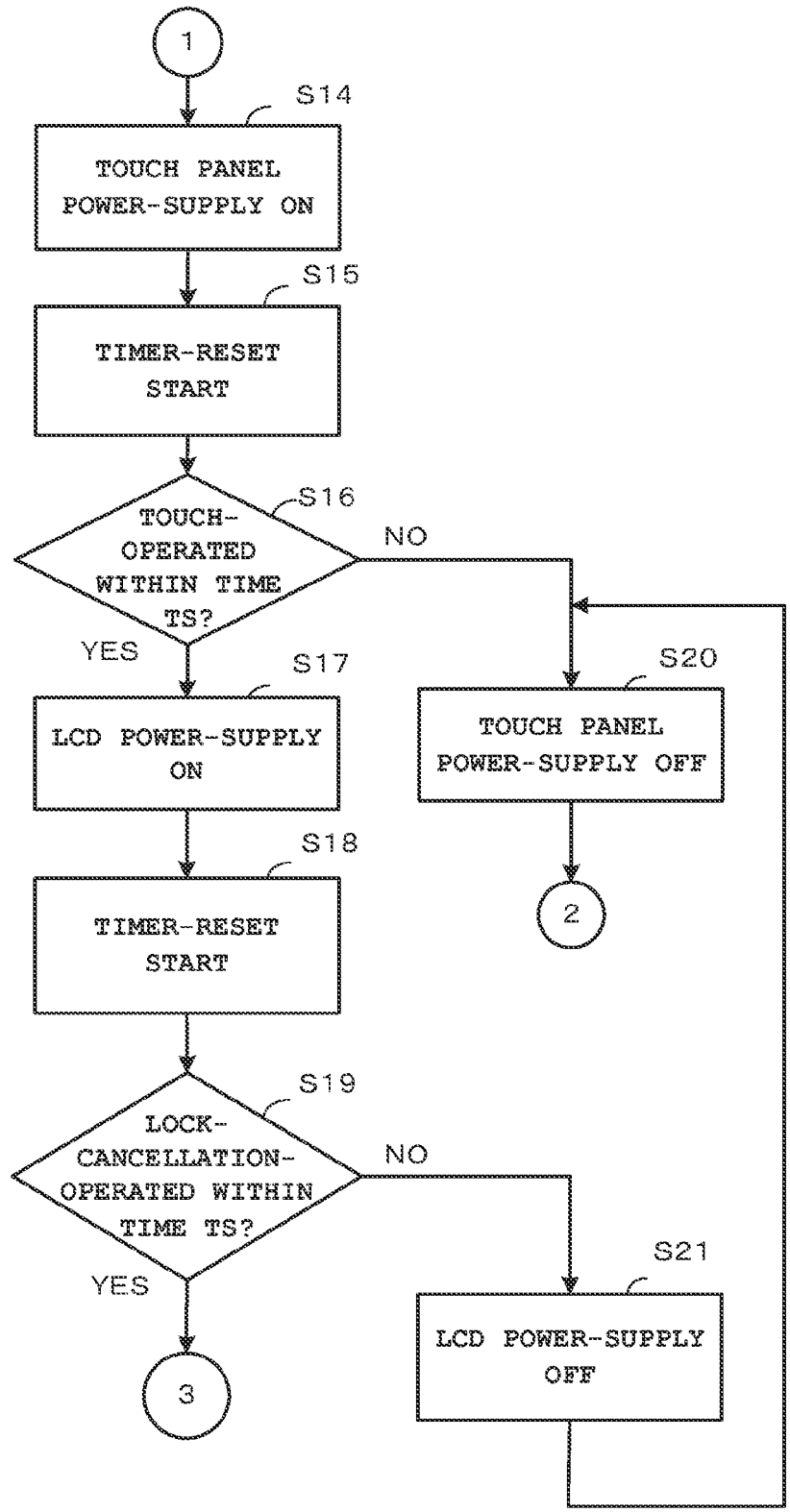
FIG. 5 is a flowchart showing the operations following those of FIG. 4.

Referring to flowcharts shown in FIG. 4 and FIG. 5, the following description will discuss operation concepts of the portable telephone in accordance with the first embodiment. In this case, respective functions described in the flowcharts are stored in the form of program codes capable of being read, and operations are successively executed in accordance with these program codes.

FIG. 4 and FIG. 5 are flowcharts that show the outline of the entire operations of the portable telephone, with features of the first embodiment being focused.

First, when a power ON operation (pressing operation) is carried out through the power supply button 4 (YES in Step S1), the CPU 1 is switched to a normal power mode so that power supply is started and given to the respective components (blocks) of the portable telephone (Step S2).

After timer resetting and starting operations, that is, after resetting a measured value of the timer unit 3 and starting its measuring operation (Step S3), the CPU 1 examines whether or not a power OFF operation (pressing operation) has been carried out by the power supply button 4 (Step S4), examines whether or not another operation has been carried out (Step S5), and also examines whether or not the measured value of the timer unit 3 has reached a non-operation period of time (timer set value) TS or more (Step S8). In the case when the power OFF operation has just been carried out (YES in Step S4), after executing the power OFF operation (not shown in the FIG.), the operations of the flows of FIG. 4 and FIG. 5 are terminated.

Moreover, in the case when another operation is carried out (YES in Step S5), as a processing (Step S6) corresponding to the operation, for example, upon receipt of a call, a processing for starting a communication is carried out, upon originating a call, a telephone number inputting processing and a calling processing from an address book are carried out, and upon forming a mail, an electronic mail forming processing or the like is carried out. Moreover, after timer resetting and starting operations of the timer unit 3 (Step S7), the CPU 1 allows the sequence to proceed to Step S8. Thereafter, each time an operation other than the power OFF operation is carried out, the processing corresponding to the operation is executed (Step S6).

In the case when the measured value of the timer unit 3 has just reached the non-operation period of time (timer set value) TS or more (YES in Step S8), switching is made from a normal power mode to a power conservation mode (Step S9). In this case, after allowing the LCD 7 to display the corresponding message, the switching to the power conservation mode may be made. Upon switching to the power conservation mode, to the CPU 1, the memory unit 2, the timer unit 3, the power supply button 4, the acceleration sensor 5, and the brightness sensor 6, the power supply, as it is, is continuously carried out; however, to the LCD 7, the touch panel 8, the LCD power supply 9, the LCD controller 10, the touch panel power supply 11, the touch panel controller 12 and the like, the power supply thereto is limited (cutoff). Thus, the display of the LCD 7 is erased to bring the touch panel 8 to an unusable state.

In the power conservation mode, the size S1 of an acceleration (vibrations) detected by the acceleration sensor 5 is acquired (Step S10), and the CPU 1 judges as to whether or not the acceleration value S1 is a predetermined reference acceleration value (threshold value) S or more (Step S11). In the case when the detected acceleration value S1 is the reference acceleration value S or more (YES in Step S11), the CPU 1 judges that the portable telephone is in a state to be highly possibly used, for example, in a state in which the portable telephone is held by the hand or in a state in which the portable telephone in the held state by the hand is shifted; however, in the case when the detected acceleration value S1 is less than the reference acceleration value S (NO in Step S11), the CPU 1 judges that there is no possibility of use, and the CPU 1 returns the sequence to the aforementioned Step S10 so that the power conservation mode, as it is, is maintained. In the case when the detected acceleration value S1 is the reference acceleration value S or more, that is, in the case when the portable telephone is highly possibly used (YES in Step S11), brightness L1 on the periphery of the portable telephone, detected by the brightness sensor 6, is acquired (Step S12).

Moreover, the CPU 1 judges whether or not the brightness value L1 acquired from the brightness sensor 6 is a predetermined reference brightness value (threshold value) L or more (Step S13). In the case when the detected brightness value L1 is the reference brightness value L or more (YES in Step S13), there is a possibility that the portable telephone has been taken out of a bag, a clothing pocket, or the like; that is, the CPU 1 judges that there is a high possibility that the portable telephone is not put into a bag, a clothing pocket, or the like, while in the case when the detected brightness value L1 is less than the reference brightness value L (NO in Step S13), the CPU judges that there is a possibility that the portable telephone is put in a bag, a clothing pocket, or the like so that the CPU 1 returns the sequence to the aforementioned Step S10, and the power conservation mode, as it is, is maintained. Supposing that the detected brightness value L1 is the reference brightness value L or more to indicate a bright environment, that is, supposing that there is a high possibility that the portable telephone is not put into a bag, or a clothing pocket, or the like (YES in Step S13), the CPU 1 allows the sequence to proceed to the flowchart of FIG. 5, wherein by turning the touch panel power supply 11 "ON", the limit on the power supply to the touch panel 8 and the touch panel controller 12 is removed (Step S14). Thus, the touch panel 8 is allowed to restore its usable state (input state capable of accepting a touch operation).

That is, in the power conservation mode, upon judging that the acceleration value S1 is the reference acceleration value S or more, with the brightness value L1 being the reference brightness value L or more, the CPU 1 judges that there is a high possibility that the portable telephone is used, and activates the touch panel 8 and the touch panel controller 12. Moreover, after the timer resetting and starting operations of the timer unit 3 (Step S15), the CPU 1 examines whether or not a touch operation is carried out on the touch panel 8 before the measured value of the timer unit 3 has elapsed the non-operation period of time (timer set value) TS (within the timer set value TS) (Step S16). Additionally, the touch position onto the touch panel 8 is not limited to the panel center position, and may be set to any position, such as a panel peripheral portion. In the case when no touch operation is executed within the period of time of the timer set value TS ("NO" in Step S16), by turning the touch panel power supply 11 "OFF", the power supply to the touch panel 8 and the touch panel controller 12 is again limited (Step S20). Thereafter, the CPU 1 returns the sequence to Step S10 of FIG. 4 where the acceleration detection is carried out.

Moreover, in the case when a touch operation is carried out within the period of time of the timer set value TS (YES in Step S16 of FIG. 5), by further turning the LCD power supply 9 "ON", while power is being supplied to the touch panel 8, the limit on the supply of power to the LCD 7 and the LCD controller 10 is removed (Step S17). Thus, the LCD 7 is allowed to restore its displayable state. Moreover, after timer resetting and starting operations of the timer unit 3 (Step S18), the CPU 1 examines whether or not a lock cancelling operation has been carried out (Step S19) before the measured value of the timer unit 3 has elapsed the non-operation period of time (timer set value) TS (within the period of time of the timer set value TS) (Step S19). This lock cancelling operation is an operation for use in, for example, cancelling a security lock by inputting a user password.

In this case, when the lock cancelling operation is not carried out within the period of time of the timer set value TS (NO in Step S19), by turning the LCD power supply 9 "OFF", the power supply to the LCD 7 and the LCD controller 10 is again limited (Step S21), while by turning the touch panel power supply 11 "OFF", the power supply to the touch panel 8 and the touch panel controller 12 is again limited (Step S20). Thereafter, the CPU 1 returns the sequence to Step S10 in FIG. 4 where the acceleration detection is carried out. Moreover, when the lock cancelling operation is carried out within the period of time of the timer set value TS (YES in Step S19), the CPU 1 allows the sequence to proceed to Step S2 in FIG. 4 so that switching is made from a power conservation mode to a normal power mode. Although illustrations thereof are omitted from the flowcharts of FIG. 4 and FIG. 5, when the power supply button 4 is pressed under the power conservation mode, the power conservation mode is cancelled to restore the normal power mode.

As described above, in the first embodiment, in the case when under a state where power supply to a predetermined peripheral device is limited by the power conservation mode, vibrations applied to the portable telephone are detected by the acceleration sensor 5 as a first state, while the brightness on the periphery of the portable telephone is detected by the brightness sensor 6 as a second state, the CPU 1 is designed to remove the limit on the supply of power to the predetermined peripheral device based upon the first and second states; therefore, without the necessity of restoring the normal power mode by cancelling the power conservation mode through a mechanical button operation in the power conservation mode, the limit on the power supply can be partially removed immediately before using the portable telephone, thereby making it possible to achieve good applicability and practical usability. In other words, for example, by simply holding the portable telephone in the hand, or by moving the portable telephone in its held sate in the hand, or by taking the portable telephone out of a bag, a clothing pocket, or the like, so as to use the portable telephone, the user is allowed to partially remove the limit on the power supply, without the necessity of any mechanical button operation. For this reason, it is not necessary to dispose the power supply button 4 at an easily operable position, and it is possible to make the portable telephone free from limitations on designing and advantageous from the view point of a large size screen or the like, thereby making it possible to achieve good applicability and high practical usability.

The predetermined peripheral device refers to the touch panel 8, and based upon the first state and the second state, by removing the limit on the supply of power to the touch panel 8, the touch panel 8 is brought into an inputtable state capable of accepting a touch operation so that even in the case when the power supply to the touch panel 8 is limited under the power conservation mode, since the touch panel 8 is activated immediately before the portable telephone is used, it is possible to carry out a touch operation immediately.

Since the power supply to the touch panel 8 is again limited in the case when no touch operation is carried out within a predetermined period of time after removing the limit on the supply of power to the touch panel 8, even when the touch panel 8 is activated on the assumption that the portable telephone is possibly used, the power supply to the touch panel 8 is again limited when no touch operation is carried out within a predetermined period of time thereafter so that it is possible to reduce wasteful power consumption.

In the case when a touch operation is carried out within the predetermined period of time after removing the limit on the supply of power to the touch panel 8, the limit on the supply of power to the LCD 7 is removed; therefore, immediately after touching the touch panel 8, the user is allowed to carry out an input operation while immediately confirming an input state of a password or the like through the display contents on the LCD 7.

In the case when within a predetermined period of time after the removal of the limit on the supply of power to the LCD 7, an operation for cancelling the power conservation mode is carried out on the touch panel 8, switching is made to the normal power mode; therefore, it is possible to restore the normal power mode from the power conservation mode by carrying out an operation on the touch panel 8.

Additionally, in the above-mentioned first embodiment, in the case when the CPU 1 judges whether or not a touch operation is carried out within a predetermined period of time after the removal of the limit on the supply of power to the touch panel 8, the non-operation time (timer set value) TS is used as the predetermined period of time; however, the present invention is not intended to be limited by this. In the same manner, in the case when the CPU judges whether or not an operation for cancelling the power conservation mode is carried out on the touch panel 8 within a predetermined period of time after the removal of the limit on the supply of power supply to the LCD 7, the non-operation time (timer set value) TS is used as the predetermined period of time; however, the present invention is not intended to be limited by this.

Moreover, in the above-mentioned first embodiment, no description has been given on a backlight (not shown) for illuminating the LCD 7; however, upon removal of the limit on the supply of power to the LCD 7, a backlight may be lighted on for a predetermined period of time, or may be turned on and off so as to urge the user to operate. Moreover, in the case of a portable telephone having an extended section (touch key, touch sensor) by which the touch panel 8 is extended, since functions assigned to the extended section (for example, stop, reproduce, fast-forward, rewind upon reproducing music) need to be operated by a touch operation on the extended section, it is not necessary to turn the LCD 7 into a completely dark state even in the case of the power conservation mode.

(Embodiment 2)

Figure 6:
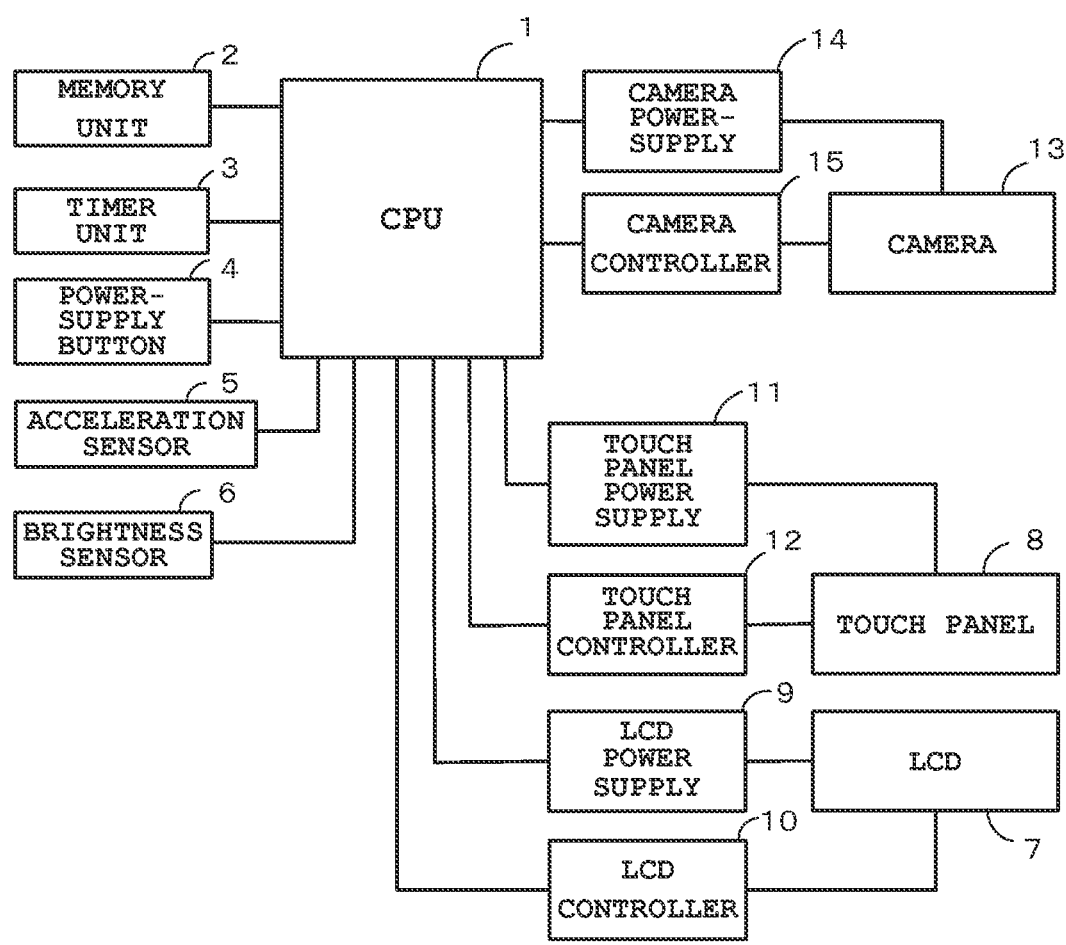
FIG. 6 is a block diagram showing a basic configuration of a multi-functional type portable telephone referred to as a smart phone that is applied as a portable terminal device in a second embodiment.
Figure 7:
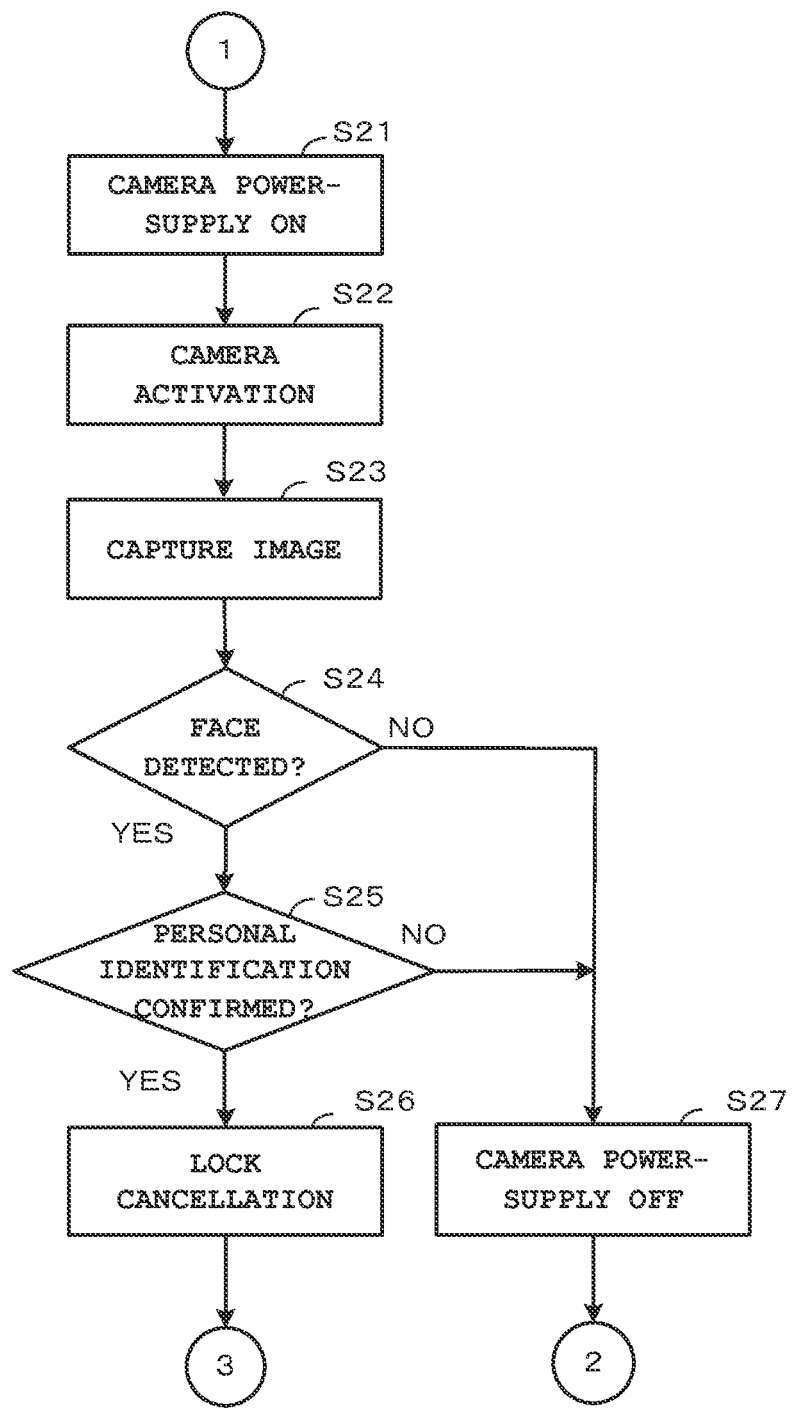
FIG. 7 is a flowchart showing operations of the portable telephone following FIG. 4 in the second embodiment.

Referring to FIG. 6 and FIG. 7, the following description will discuss a second embodiment of the present invention.

In the above-mentioned first embodiment, the present invention is applied to the touch panel 8 as a predetermined peripheral device in which the power supply is limited in the power conservation mode, and in the state where the power supply to the touch panel 8 is limited, the limit on the supply of power to the touch panel 8 is removed in accordance with detection results of the acceleration sensor 5 and the brightness sensor 6; however, in the second embodiment, the present invention is applied to a camera (image capture device) as the predetermined peripheral device in which the power supply is limited in the power conservation mode, and in the state where the power supply to the camera is limited, the limit on the supply of power to the camera is removed in accordance with detection results of the acceleration sensor 5 and the brightness sensor 6. In this case, in the two embodiments, those parts that are basically the same or the same in terms of names are indicated by the same reference numerals, and the descriptions thereof will be omitted, and the following description will mainly discuss features of the second embodiment.

FIG. 6 is a block diagram showing a basic configuration of a multi-functional type portable telephone referred to as a smart phone that is applied as a portable terminal device in the second embodiment.

In addition to the same functions as those of the aforementioned first embodiment, this portable telephone (smart phone) of the second embodiment is provided with a camera function, and an image recognizing function that carries out a user identification (personal identification) based upon an image captured by the camera function. Moreover, in the same manner as in the first embodiment, the portable telephone is also provided with a CPU 1 serving as a central unit, a memory unit 2, a timer unit 3, a power supply button 4, an acceleration sensor 5, a brightness sensor 6, an LCD 7, a touch panel 8, an LCD power supply 9, an LCD controller 10, a touch panel power supply 11, and a touch panel controller 12. Moreover, a camera 13, a camera power supply 14 and a camera controller 15 are installed in the portable telephone of the second embodiment.

The camera 13, which corresponds to a predetermined peripheral device in which the power supply is limited in a power conservation mode, is provided with image pickup devices such as CCD's for use in capturing an image of a subject, and controlled by the camera controller 15. Moreover, the camera 13 is installed in the vicinity of (for example, lower side) the LCD 7 and the touch panel 8 that constitute a touch screen (touch input display unit) on the front face portion of a casing of the portable telephone. That is, the camera 13 is disposed on the front face portion of the casing in the same manner as in the LCD 7 and the touch panel 8. The camera power supply 14 supplies power to the camera controller 15 and the camera 13 under control by the CPU 1, and in the power conservation mode, the CPU 1 is designed to limit (cut-off) the power supply to the camera controller 15 and the camera power supply 14 by turning "OFF" the camera power supply 14.

FIG. 7 is a flowchart showing operations of the portable telephone following FIG. 4 in the second embodiment. Additionally, in the second embodiment also, operations are carried out in accordance with the flow of FIG. 4.

First, in the case when the acceleration value S1 detected by the acceleration sensor 5 in the power conservation mode is its reference acceleration value S or more (YES in Step S11 of FIG. 4), with the brightness value L1 detected by the brightness sensor 6 being its reference brightness value L or more (YES in Step S13), the CPU 1 allows the sequence to proceed to the flow of FIG. 7 on the assumption that the portable telephone is highly possibly used so that by turning the camera power supply 14 "ON", the limit on the supply of power to the camera 13 and the camera controller 15 is removed (Step S21). Thus, the camera 13 is activated (Step S22), and an automatic image capturing processing is carried out (Step S23). Moreover, the CPU 1 examines whether or not the face portion of a person has been detected by analyzing the image captured by the camera 13 (Step S24).

If the face of a person cannot be detected (NO in Step S24), by turning the camera power supply 14 "OFF", the power supply to the camera 13 and the camera controller 15 is again limited (Step S27). Thereafter, the CPU 1 returns the sequence to Step S10 of FIG. 4 for use in detecting the acceleration. Moreover, if the face of a person can be detected (YES in Step S24), a personal identification is carried out by collating the face with registered facial images preliminarily registered as user personal images (Step S25). As a result, if the personal identification is not made (NO in Step S25), the CPU 1 allows the sequence to proceed to the aforementioned Step S27, and by turning the camera controller power supply 15 "OFF", the power supply to the camera 13 and the camera controller 15 is again limited, while if the personal identification is successfully made (YES in Step S25), the security lock is cancelled (Step S26). Then, the CPU 1 allows the sequence to proceed to Step S2 of FIG. 4 so that switching is made from the power conservation mode to the normal power mode.

As described above, in the second embodiment, in the case when in the state where the power supply to the camera 13 is limited by the power conservation mode, the vibrations applied to the portable telephone are detected by the acceleration sensor 5 as the first state, with the brightness on the periphery of the portable telephone being detected by the brightness sensor 6 as the second state, the CPU 1 removes the limit on the supply of power to the camera 13 to be brought into a state capable of capturing an image, based upon the first state and the second state; therefore, even when the power supply to the camera 13 is limited by switching modes to the power conservation mode, by removing the limit on the supply of power to the camera 13 immediately before the use of the portable telephone, the camera can be activated.

Moreover, after removing the limit on the supply of power to the camera 13 in the power conservation mode, the personal identification is carried out based upon the captured image, and as a result, if the personal identification is not made, the power supply to the camera 13 is again limited; therefore, wasteful power consumption can be reduced.

Furthermore, after removing the limit on the supply of power to the camera 13 in the power conservation mode, the personal identification is carried out based upon the captured image, and as a result, if the personal identification is successfully made, the normal power mode is restored; therefore, the restoring processing is easily realized without the necessity of the user having to pay special attention, thereby making it possible to achieve good applicability with high practical effects.

In the above-mentioned respective embodiments, in the case when vibrations applied to the portable telephone are detected by the acceleration sensor 5 as the first state, with the brightness on the periphery of the portable telephone being detected by the brightness sensor 6 as the second state, based upon the first state and the second state, the limit on the supply of power to a predetermined peripheral device is removed; however, the CPU 1 judges whether or not the second state satisfies a predetermined condition, and when the CPU 1 judges that the condition is satisfied, the limit on the supply of power may be removed. For example, supposing that the condition to be satisfied by the second state is "time zone", in time zones in the middle of the night and in the early morning, the detection results by the brightness sensor 6 may be ignored, and by using only the results of detection by the acceleration sensor 5, the limit on the supply of power may be removed. With this arrangement, it is possible to prevent an occurrence of a state in which in a completely dark state, such as while in bed, the limit on the supply of power cannot be cancelled for a long time.

Moreover, in the above-mentioned respective embodiments, the reference acceleration value S is given as a fixed value; however, the reference acceleration value S may be altered in accordance with the results of detection by the brightness sensor 6. For example, an arrangement is proposed in which in the case when a dark state is detected by the brightness sensor 6, the reference acceleration value S may be set to be greater; thus, it is possible to prevent an occurrence of such an erroneous operation as to remove the limit on the supply of power based upon a detection of a small acceleration in a bag or a pocket. That is, in a dark state, the limit on the supply of power may be removed by the detection of a large acceleration. With this arrangement, it is possible to prevent an occurrence of a state in which in a completely dark state, such as while in bed, the limit on the supply of power cannot be removed for a long time.

Moreover, in the above-mentioned respective embodiments, an arrangement is made in which upon limiting a power supply to a predetermined peripheral device by the power conservation mode, the power supply is cut-off; however, not limited to the cut-off, for example, a partial supply may be made to the peripheral device, or the amount of power supply may be decreased, or the supply is made intermittently; that is, the way how to limit the power supply can be desirably determined.

Furthermore, in the above-mentioned respective embodiments, in the case when the acceleration value S1 detected by the acceleration sensor 5 is its reference acceleration value S or more and when the brightness value L1 detected by the brightness sensor 6 is its reference brightness value L or more, the CPU 1 judges that the portable telephone is in a state to be highly possibly used; however, the CPU 1 may judge that the portable telephone is in a state to be highly possibly used based upon a state of change in the acceleration and brightness. In other words, not limited to the comparison between the detected result and the threshold value (reference acceleration value S or reference brightness value L), by detecting a state of change in the acceleration such as a case in which vibrations have increased drastically, or by detecting a state of change in the brightness such as a case in which the brightness has increased abruptly, it may be judged that the portable telephone is in a state to be highly possibly used based upon a state of change in the acceleration or a state of change in the brightness.

Furthermore, in the above-mentioned respective embodiments, the brightness sensor 6 has been exemplified as a sensor for detecting the surface of a portable telephone or a peripheral state thereof as a second state; however, not limited to the brightness sensor 6, for example, a proximity sensor, such as that of an induction type, an electrostatic capacitive type, an electromagnetic wave type, or an infrared-ray type, which detects an approaching state of a person, may be used, and in addition to this, by using a contact sensor, a temperature sensor or the like that detects a contact state to a human body, the surface of the portable telephone or the peripheral state thereof may be detected.

In the above-mentioned respective embodiments, the portable telephone is exemplified as a portable terminal device; however, the portable terminal device may be prepared as a digital camera (compact camera), a PDA (personal portable information communication apparatus), a portable music player, a portable game machine and the like.

Additionally, the "device" and "unit" used in the above-mentioned respective embodiments may be separated into a plurality of casings depending on functions thereof, and are not limited to a single casing. Moreover, the respective steps described in the aforementioned flowcharts are not limited to processing that are time-sequentially executed, and a plurality of steps may be processed in parallel with one another or may be individually processed independently.

The part or whole of the embodiment described above can be described as, but not limited to, the following supplementary notes. The following description will collectively discuss various modes of the present invention as supplementary notes.

(Supplementary Note 1)

Figure 8:
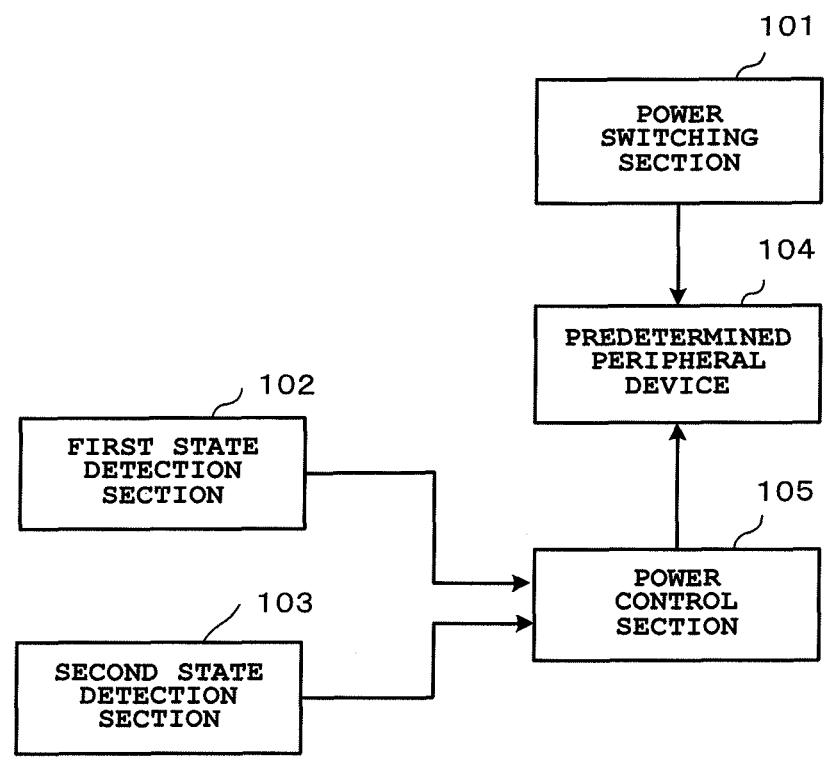
FIG. 8 is a functional block diagram for use in explaining functions of the present invention.

FIG. 8 is a structural diagram of Supplementary Note 1. As depicted in this drawing, the invention described in Supplementary Note 1 provides a portable terminal device including a power switching section 101 for carrying out switching between a normal power state in which power supply is not limited and a power conservation state in which the power supply is limited to reduce power consumption, and the portable terminal device is further provided with:

a first state detection section 102 for detecting vibrations applied to the portable terminal device as a first state (CPU 1 and acceleration sensor 5 in FIG. 1);

a second state detection section 103 for detecting a surface state of the portable terminal device or a peripheral state thereof as a second state (CPU 1 and brightness sensor 6 in FIG. 1); and a power control section 105 (CPU 1, LCD power supply 9 and touch panel power supply 11 in FIG. 1 and camera power supply 14 in FIG. 6) which, in the case when a power supply to a predetermined peripheral device 104 (touch panel 8 in FIG. 1 or camera 13 in FIG. 6) is limited, with switching being made by the power switching section 101 to the power conservation state, removes the limit on the supply of power to the predetermined peripheral device based upon the first state detected by the first state detection section 102 and the second state detected by the second state detection section 103.

(Supplementary Note 2)

The portable terminal device according to Supplementary Note 1, wherein the predetermined peripheral device is a touch input section for inputting data in response to a touch operation, and the power control section removes the limit on the supply of power to the touch input section based upon the first state detected by the first state detection section and the second state detected by the second state detection section, and brings the touch input section to an inputtable state for accepting a touch operation.

(Supplementary Note 3)

The portable terminal device according to Supplementary Note 2, further comprising:

a touch operation judging section for judging whether or not a touch operation to the touch input section has been carried out within a predetermined period of time after the limit on the supply of power to the touch input section was removed by the power control section in the power conservation state, wherein upon judging that no touch operation has been carried out within the predetermined period of time by the touch operation judging section, the power control section again limits the power supply to the touch input section.

(Supplementary Note 4)

The portable terminal device according to Supplementary Note 3, further comprising:

a display section for displaying data, wherein in the case when the power supply to the display section is limited, with switching being made by the power switching section to the power conservation state, upon judging that a touch operation has been carried out within the predetermined period of time by the touch operation judging section, the power control section removes the limit on the supply of power to the display section.

(Supplementary Note 5)

The portable terminal device according to Supplementary Note 4, further comprising:

a cancellation operation judging section for judging whether or not an operation for canceling the power conservation state has been carried out within a predetermined period of time after the removal of the limit on the supply of power to the display section by the touch input section, wherein upon judging that a canceling operation has been carried out in the touch input section by the cancellation operation judging section, the power switching section carries out switching from the power conservation state to the normal power state.

(Supplementary Note 6)

The portable terminal device according to Supplementary Note 1, wherein the predetermined peripheral device is an image capture section for capturing an image of a subject, and the power control section removes the limit on the supply of power to the image capture section based upon the first state detected by the first state detection section and the second state detected by the second state detection section so as to bring the image capture section to a state capable of capturing an image.

(Supplementary Note 7)

The portable terminal device according to Supplementary Note 6, further comprising:

an image recognizing step for carrying out a personal identification based upon an image captured by the image capture section after removing the limit on the supply of power to the image capture section by the power control section in the power conservation state, and in the case when the personal identification is not confirmed by the image recognizing section, the power control section again limits power supply to the image capture section.

(Supplementary Note 8)

The portable terminal device according to claim 6 or claim 7, wherein in the case when the personal identification has been confirmed by the image recognizing section, the power switching section carries out switching from the power conservation state to the normal power state.

(Supplementary Note 9)

The portable terminal device according to anyone of claim 1 to claim 8, wherein in the case when, upon removing the limit on the supply of power to the predetermined peripheral device based upon the first state detected by the first state detection section and the second state detected by the second state detection section, the power control section judges whether or not the second state detected by the second state detection section satisfies a predetermined condition, and upon judging that the condition is satisfied, removes the limit on the supply of power to the predetermined peripheral device.

(Supplementary Note 10)

A non-transitory computer-readable storage medium having program stored thereon that is executable by a computer to perform functions comprising:

carrying out switching between a normal power state in which power supply is not limited and a power conservation state in which the power supply is limited to reduce power consumption;

detecting vibrations applied to a portable terminal device as a first state;

detecting a surface state of the portable terminal device or a peripheral state thereof as a second state; and in the case when a power supply to a predetermined peripheral device is limited, with switching being set to the power conservation state, removing the limit on the supply of power to the predetermined peripheral device based upon the first detected state and the second detected state.

DESCRIPTION OF REFERENCE NUMERALS

1 CPU
2 memory unit
3 timer unit
4 power supply button
5 acceleration sensor
6 brightness sensor
7 LCD
8 touch panel
9 LCD power supply
10 LCD controller
11 touch panel power supply
12 touch panel controller
13 camera
14 camera power supply
15 camera controller

The invention claimed is:

1. A portable terminal device including a power switching section for carrying out switching between a normal power state in which power supply is not limited and a power conservation state in which the power supply is limited to reduce power consumption, the portable terminal device further comprising: a first state detection section for detecting vibrations applied to the portable terminal device as a first state; a second state detection section for detecting a surface state of the portable terminal device or a peripheral state thereof as a second state, which comprises detecting a surrounding environment of the portable terminal device; and a power control section which, in the case when a power supply to a predetermined peripheral device is limited, with switching being made by the power switching section to the power conservation state, removes the limit on the supply of power to the predetermined peripheral device based upon the first state detected by the first state detection section and the second state detected by the second state detection section, wherein the predetermined peripheral device is a touch input section of the portable terminal device's touch screen for inputting data in response to a touch operation, and the power control section removes the limit on the supply of power to the touch input section based upon the first state detected by the first state detection section and the second state detected by the second state detection section, and brings the touch input section to an inputtable state for accepting a touch operation, wherein the portable terminal device further comprises a touch operation judging section for judging whether or not a touch operation to the touch input section has been carried out within a predetermined period of time after the limit on the supply of power to the touch input section was removed by the power control section in the power conservation state, wherein upon judging that no touch operation has been carried out within the predetermined period of time by the touch operation judging section, the power control section again limits the power supply to the touch input section and upon judging that a touch operation has been carried out within the predetermined period of time by the touch operation judging section, the power control section removes the limits on the power supply to the touch input section, wherein the portable terminal device further comprises a display section of the portable terminal device's touch screen for displaying data, and wherein in the case when the power supply to the display section is limited, with switching being made by the power switching section to the power conservation state, upon judging that no touch operation has been carried out within the predetermined period of time by the operation judging section, the power control section again limits the supply of power to the display section and upon judging that a touch operation has been carried out within the predetermined period of time by the touch operation judging section, the power control section removes the limit on the supply of power to the display section.

2. The portable terminal device according to claim 1, further comprising:

a cancellation operation judging section for judging whether or not an operation for cancelling the power conservation state has been carried out within a predetermined period of time after the removal of the limit on the supply of power to the display section by the touch input section, wherein upon judging that a cancelling operation has been carried out in the touch input section by the cancellation operation judging section, the power switching section carries out switching from the power conservation state to the normal power state.

3. The portable terminal device according to claim 1, wherein the predetermined peripheral device is an image capture section for capturing an image of a subject, and the power control section removes the limit on the supply of power to the image capture section based upon the first state detected by the first state detection section and the second state detected by the second state detection section so as to bring the image capture section to a state capable of capturing an image.

4. The portable terminal device according to claim 3, further comprising: an image recognizing section for carrying out a personal identification based upon an image captured by the image capture section after removing the limit on the supply of power to the image capture section by the power control section in the power conservation state, and in the case when the personal identification is not confirmed by the image recognizing section, the power control section again limits power supply to the image capture section.

5. The portable terminal device according to claim 3, wherein in the case when the personal identification has been confirmed by the image recognizing section, the power switching section carries out switching from the power conservation state to the normal power state.

6. The portable terminal device according to claim 1, wherein in the case when, upon removing the limit on the supply of power to the predetermined peripheral device based upon the first state detected by the first state detection section and the second state detected by the second state detection section, the power control section judges whether or not the second state detected by the second state detection section satisfies a predetermined condition, and upon judging that the condition is satisfied, removes the limit on the supply of power to the predetermined peripheral device.

7. A non-transitory computer-readable storage medium having a program stored thereon that is executable by a computer to perform functions comprising: a power switching processing for carrying out switching between a normal power state in which power supply is not limited and a power conservation state in which the power supply is limited to reduce power consumption; a first detection processing for detecting vibrations applied to a portable terminal device as a first state; a second detection processing for detecting a surface state of the portable terminal device or a peripheral state thereof as a second state, which comprises detecting a surrounding environment of the portable terminal device; and a power control processing for, in the case when a power supply to a predetermined peripheral device is limited, with switching being set to the power conservation state, removing the limit on the supply of power to the predetermined peripheral device based upon the first detected state and the second detected state, wherein the predetermined peripheral device is a touch input section of the portable terminal device's touch screen for inputting data in response to a touch operation, and the power control processing removes the limit on the supply of power to the touch input section second state detected by the second state detection processing, and brings the touch input section to an inputtable state for accepting a touch operation, wherein a touch operation judging processing for judging whether or not a touch operation to the touch input section has been carried out within a predetermined period of time after the limit on the supply of power to the touch input section was removed by the power control processing in the power conservation state is performed, wherein upon judging that no touch operation has been carried out within the predetermined period of time by the touch operation judging processing, the power control processing again limits the power supply to the touch input section and upon judging that a touch operation has been carried out within the predetermined period of time by the touch operation judging section, the power control section removes the limits on the power supply to the touch input section, and wherein in the case when the power supply to a display section of the portable terminal device's touch screen for displaying data is limited, with switching being made by the power switching processing to the power conservation state, upon judging that no touch operation has been carried out within the predetermined period of time by the touch operation judging section, the power control section again limits the supply of power to the display section and upon judging that a touch operation has been carried out within the predetermined period of time by the touch operation judging processing, the power control processing removes the limit on the supply of power to the display section.

\* \* \* \* \*